May 18, 1943  C. J. KESSLER  2,319,739
LIQUID DISPENSING APPARATUS
Filed Sept. 6, 1941  3 Sheets-Sheet 2

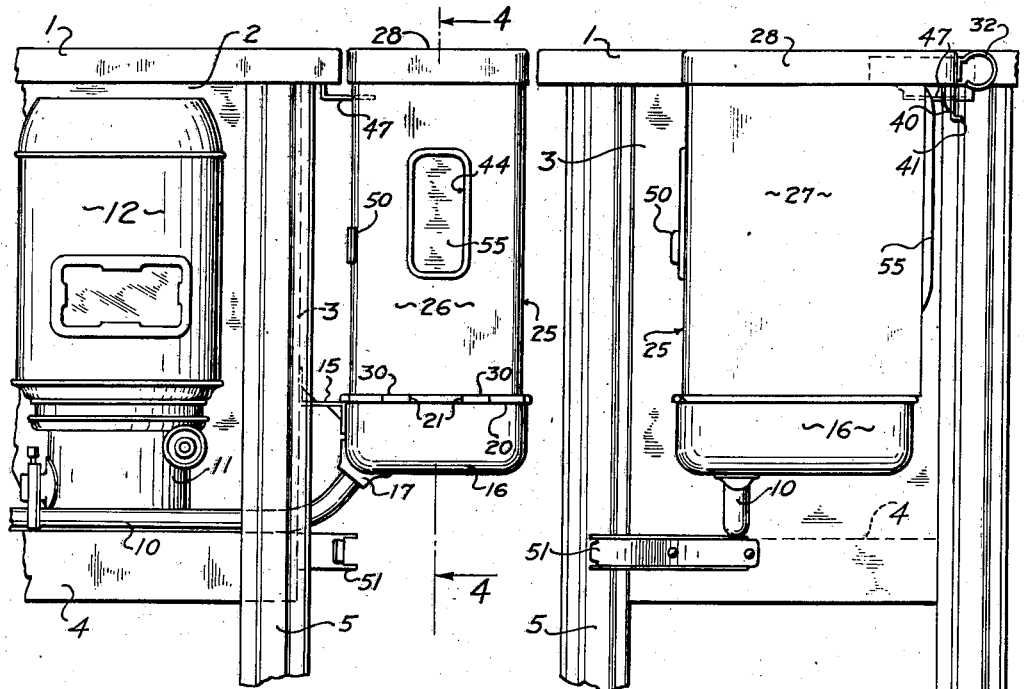
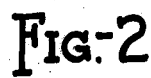
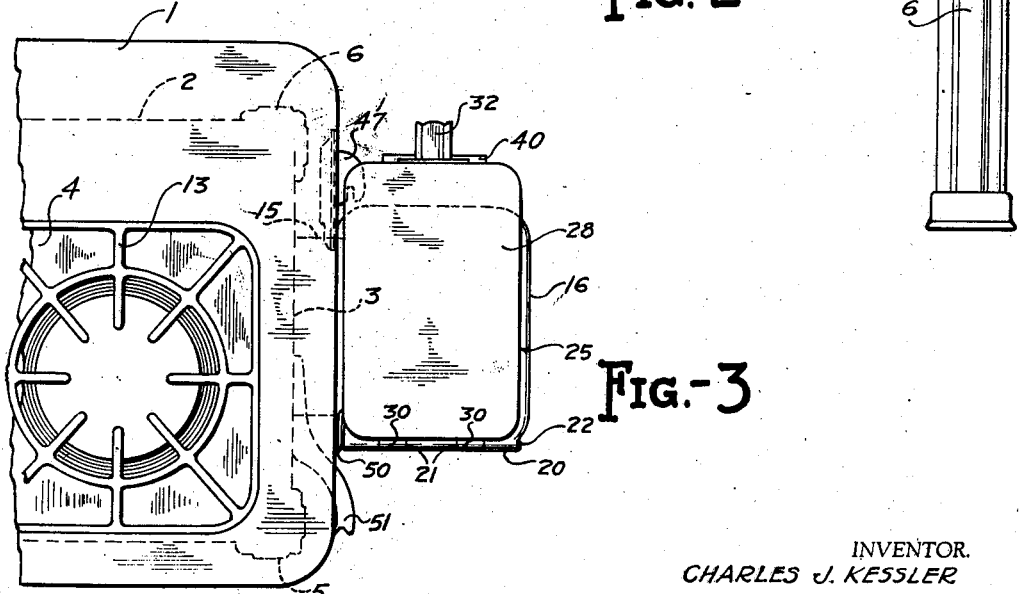

INVENTOR.
CHARLES J. KESSLER
BY
ATTORNEYS.

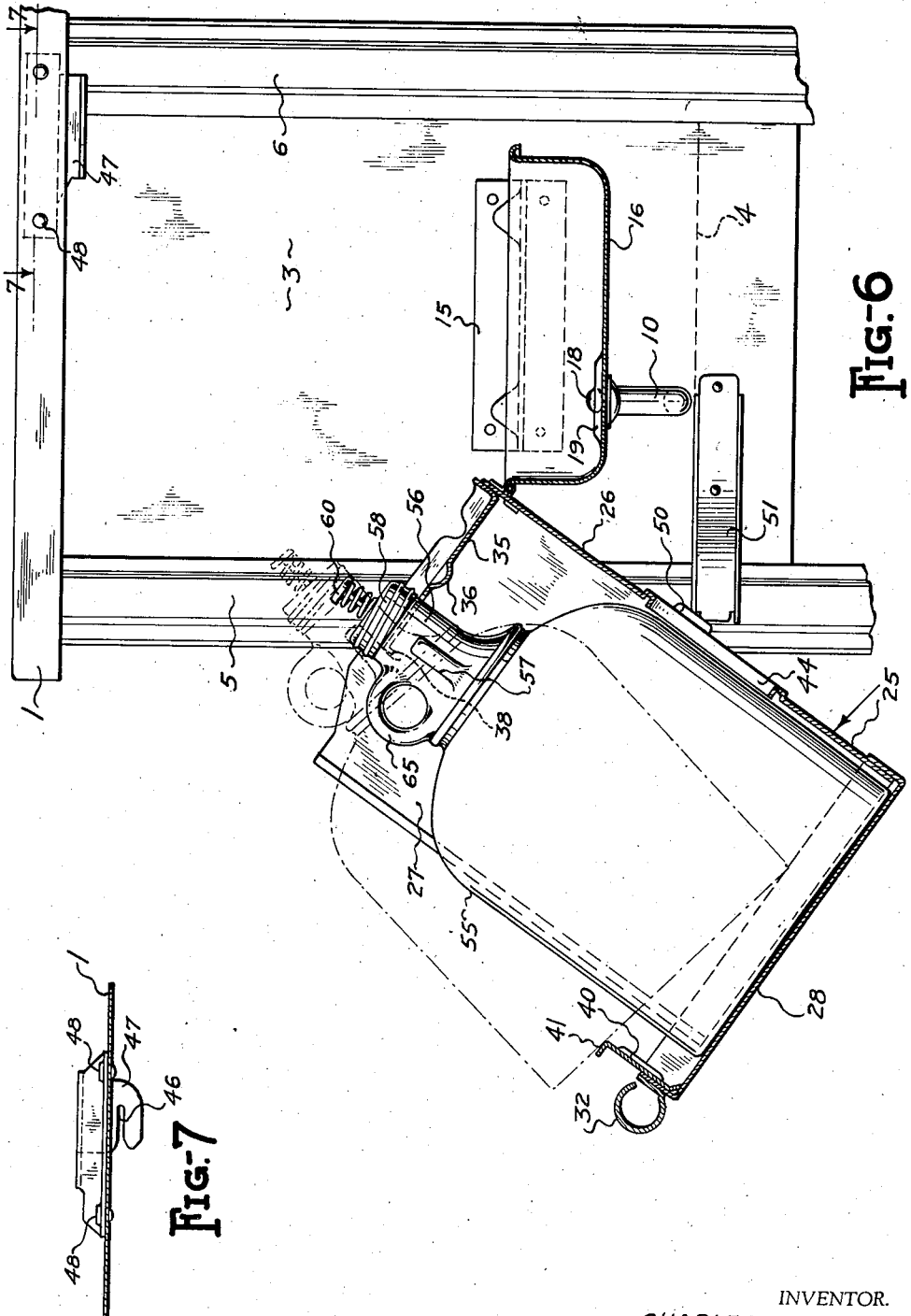

Patented May 18, 1943

2,319,739

UNITED STATES PATENT OFFICE 2,319,739

LIQUID DISPENSING APPARATUS

Charles J. Kessler, Cleveland Heights, Ohio, assignor to Perfection Stove Company, Cleveland, Ohio, a corporation of Ohio Application September 6, 1941, Serial No. 409,824

10 Claims. (Cl. 158—40)

This invention consists of improvements in liquid dispensing means or apparatus.

Objects of the invention are to provide a relatively compact and neat appearing liquid dispensing apparatus that is easy and convenient of manipulation in the replenishing of the liquid supply; to provide apparatus of this nature involving a relatively simple liquid dispensing container or reservoir in the form of a glass bottle or the like that can be inexpensively produced, the same, when placed in service, being equipped with the usual simple and cheap removable valved cap; and to provide a cabinet-like enclosure or casing for accommodating and practically concealing said container or reservoir, and the bottom portion of which is formed by a liquid distributing receptacle, while the superstructure that is hingedly connected to the front of said receptacle constitutes a carrier that is adapted to be swung between a forwardly and downwardly inclined position, wherein it receives the bottle-like reservoir, and a position squarely over the distributing receptacle, wherein it supports the reservoir in an inverted position in discharging relation to said receptacle, the valve of the cap being automatically opened in the usual way by contact of its stem with a stationary part, such as the bottom of the receptacle, when the reservoir is in inverted position.

Another object of the invention is to so design the parts that the container or reservoir, should it be inadvertently placed in the carrier in improper position, will gravitate to correct position and assume operative relation to the carrier as the latter is swung to upright position over the distributing receptacle. A further object is to provide a cabinet-like structure suitable for use in oil cook stoves that incorporate the above described liquid dispensing apparatus as a part of the fuel system and wherein the top of the cabinet-like enclosure or casing that constitutes the carrier of the apparatus will, when said carrier is in normal position, be disposed in the plane of the top of said structure and will form, in effect, an extension of said top, the dispensing receptacle being very firmly attached to the end panel of the structure, and said structure being provided with stop means for holding the carrier in its two extreme positions. Because of its peculiar adaptability to oil cook stoves, in connection with which the invention was conceived, I have disclosed the invention herein as embodied in such a structure.

Figure 4:
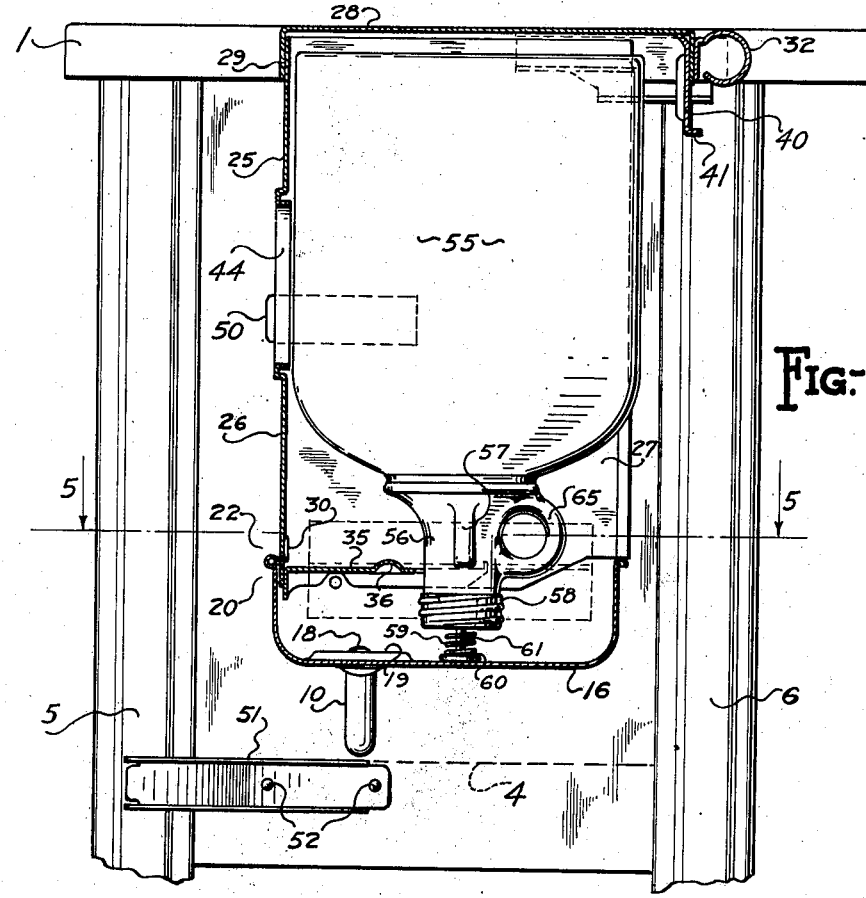
Figure 5:
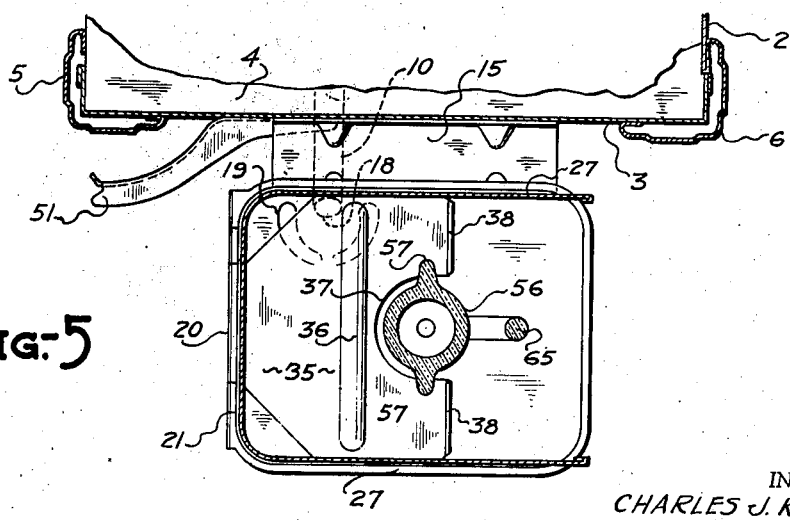

Objects and advantages additional to those enumerated above will appear as I proceed to describe the invention in detail by reference to the accompanying drawings wherein Fig. 1 is a partial front elevation of an oil cook stove incorporating my improvements; Fig. 2 is a partial right hand end elevation of the stove; Fig. 3 is a partial plan view thereof; Fig. 4 is a fragmentary end elevation of the stove on a scale considerably enlarged over that of the preceding views and showing the cabinet structure of the liquid dispensing apparatus in central vertical section, the plane of section being indicated by the line 4—4 of Fig. 1; Fig. 5 is a horizontal section on the line 5—5 of Fig. 4; Fig. 6 is a view, similar to Fig. 4, but showing the carrier swung downwardly and forwardly to the position it occupies when the bottle-like reservoir is to be placed therein or removed therefrom, and Fig. 7 is a sectional detail on the line 7—7 of Fig. 6.

The oil cook stove in which I have shown my improvements incorporated includes the usual top 1, back 2, end panel 3, base or drip pan 4, and front and rear legs 5 and 6, respectively, all suitably connected together, as by screws or bolts.

Extending longitudinally of the stove above the drip pan or base 4 is a fuel pipe 10 that has one of its ends projected through a hole in the end panel 3. Communicatively connected with the fuel pipe 10 are the stove burners, one of which is shown at 11 in Fig. 1. Each burner is surmounted by a drum or chimney, that of the burner shown being designated 12. The upper end of each drum or chimney is disposed a short distance below an opening in the top 1 that is provided with the grid 13 (Fig. 3).

Securely fastened to the end panel 3, by a relatively wide bracket 15, is the basin-like distributing receptacle 16 of the liquid fuel dispensing apparatus. Said receptacle is substantially rectangular in plan, has a flat bottom wall, and is located with its bottom wall a suitable distance below the horizontal plane of the maximum fuel level in the burners. Outwardly beyond the end panel 3 the fuel pipe 10 is inclined upwardly and has communicative connections with the receptacle 16 through a fitting 17, the outlet opening of the receptacle being shown at 18 in Figs. 4, 5 and 6. A relatively shallow arcuate dam 19 separates the outlet opening 18 from the major part of the bottom area of the receptacle so as to prevent any sediment that may settle in the receptacle from reaching the outlet opening. The dam is preferably formed by an upwardly pressed part of the bottom wall.

The upper edge portion of the peripheral wall of the receptacle 16 is curled outwardly and over, and across the front of the receptacle, said portion is more ample than elsewhere and assumes a tubular formation, as indicated at 20. The tubular portion is interrupted intermediate its ends by notches designated 21. Thus, a hinged knuckle, in effect, is produced through which is extended a pintle 22.

Adapted to be disposed over the distributing receptacle 16 is a carrier designated generally by the reference numeral 25. This carrier is made up of a front wall 26, side walls 27 that are preferably integral with the front wall, and a top wall 28 provided with a peripheral flange 29 that telescopes over the upper ends of the walls 26 and 27 and is suitably secured thereto, as by welding. The upper surface of the wall 28 is substantially in the plane of the corresponding surface of the stove top when the parts are in normal position, thus permitting said wall to serve as an extension of the top. Projected outwardly through slots adjacent the lower edge of the front wall 26 of the carrier are hinge straps 30, the upper ends of which are spot welded or otherwise fastened to the inner side of said wall while their lower ends are likewise fastened to the outer side of the wall below the aforesaid slots. The middle parts of the hinge straps are made U-shaped and encircle the pintle 22 within the notches 21. In this manner, the carrier is pivotally or hingedly connected to the dispensing receptacle and is adapted to be swung between its normal position thereover, shown in Figs. 1, 2 and 4, and the forwardly and downwardly inclined position, shown in Fig. 6, the operation being facilitated by means of a ring-like handle 32 that is attached to the rear side of the peripheral flange 29 of the top wall 28.

Occupying the end of the carrier nearest the receptacle 16, and extending from the front wall 26 thereof rearwardly to a point beyond the transverse center of the carrier is a sheet metal support 35 for the liquid container or reservoir, when the latter is in its inverted position, as will presently appear. Because of the load it is required to sustain, and the fact that it is made of sheet metal, the support 35 is stiffened by a transverse rib 36. Also, the support has flanges about its front and sides that are secured, as by welding, to the corresponding walls of the carrier. The free edge of the support is provided with a substantially semi-circular notch 37, and on opposite sides thereof is turned upwardly to provide flanges 38. Depending from the top wall 28 within the rear side of its peripheral flange 29, and welded or otherwise secured to said flange, is a retainer 40 that serves to prevent undue rearward tilting of the reservoir when the latter is swung, with the carrier, to inverted position over the distributing receptacle. The retainer is desirably made of sheet metal and its edge remote from the top 28 is turned outwardly to form a flange 41. The front wall 26 of the carrier 25 is provided with a sight opening 44 that is framed by a depressed bead that enhances the appearance of and stiffens the wall. When the carrier is in normal position over the distributing receptacle 16, a part of the rear edge of its side wall 27 nearest the end panel 3 occupies a notch 46 in a hook-like stop 47 (Fig. 7) that is carried by the stove structure. According to the illustrated embodiment, said stop is secured by rivets 48 to the inner side of the adjacent end flange of the stove top 1. The carrier is sustained in reservoir receiving position, shown in Fig. 6, by the engagement of a lug 50, that is secured to the aforesaid side wall 27 of the carrier, with a stop 51 that is secured by fastening means 52 to the end of the stove structure.

The liquid dispensing container or reservoir is designated 55, and desirably consists of a glass bottle having a relatively long neck 56 that defines the filling and discharge opening. Lugs 57 extend laterally from the neck 56 and their forward ends are desirably flat and constitute abutments that face in the direction of the aforesaid opening. Applied to the neck is a screw cap 58 incorporating the usual valve that is urged toward closed position by a spring 59 that is compressed between a part of the cap and a head 60 on the valve stem 61. Projecting from one side of the neck 56 midway between the lugs 57 is a ring like handle 65.

The carrier 25 is shown in its normal operative position in Figs. 1, 2 and 4. When the carrier is in this position the reservoir 55 is sustained by the support 35, through the engagement therewith of the lugs 57, at such an elevation that the valve incorporated in the cap 58 is unseated by engagement of the head of its stem 61 with the bottom of the distributing receptacle 16 thereby to cause the receptacle to fill with liquid from the reservoir to a depth sufficient to liquid seal the discharge opening of the reservoir, the liquid level in the receptacle 16 determining the maximum fuel level in the burners, as will be readily understood.

When it becomes necessary to replenish the fuel supply, which fact may be ascertained by looking through the sight opening 44 at the liquid remaining in the reservoir 55, the ring-like handle 32 is grasped and the carrier 25 swung by means thereof to the position shown in Fig. 6, in which position the carrier is sustained by engagement of the lug 50 with the stop 51. Now, by taking hold of the handle 65, the reservoir 55 may readily be lifted from the carrier, the reservoir being enough shorter than the distance between the support 35 and the wall 28 to allow, when the reservoir settles down against said wall, the free passage of the lugs 57 beneath the flanges 38 of the support 35. To refill the reservoir, the screw cap 58 is removed, and after the reservoir is refilled and the cap replaced it, or another previously filled reservoir, held by its handle 65, is lowered into the carrier. Ordinarily, the reservoir will assume correct position in the carrier, shown in full lines in Fig. 6. However, should the bottom of the reservoir be permitted to drag over the flange 41 of the retainer 40, the reservoir is liable to lodge in some such position as that indicated in dot-and-dash lines in Fig. 6 with the sides of the lugs 57 engaging the flanges 38 of the support 35. In such case, during the initial upward movement of the carrier as it is swung by means of the handle 32 to upright position over the receptacle 16, the reservoir will slide off of the retainer 40 and will drop to proper position within the carrier with its bottom resting against the wall 28, the lugs 57 spaced from the support 35, and the neck 56 within the notch 37. As the carrier approaches upright position, the reservoir will slide downward until the lugs 57 contact the support 35, the parts resuming operative position when movement of the carrier is arrested by the stop 47.

When the carrier is swung downward to the position shown in Fig. 6, as previously described, any liquid dripping from the parts of the cap and valve that were submerged will lodge on the support 35 and drain to the side thereof adjacent the hinge of the carrier and will be returned to the receptacle 16 when the carrier is again swung to upright position thereover.

Having thus described my invention, what I claim is:

1. In apparatus of the class described, a distributing receptacle, a carrier supported for movement between a reservoir receiving position at one side of the receptacle and a reservoir supporting position over the receptacle, the carrier incorporating a bifurcated reservoir support that is disposed over the receptacle when the carrier is in the second mentioned position, and a reservoir provided with a neck defining its discharge opening and having abutment means extending laterally from the neck for engagement with the aforesaid support thereby to sustain the reservoir with its neck within the bifurcation of the support and its discharge opening in a position to be liquid sealed within the distributing receptacle.

2. In apparatus of the class described, a distributing receptacle, a carrier supported for movement between a reservoir receiving position at one side of the receptacle and a reservoir supporting position over the receptacle, a reservoir support incorporated in the carrier and disposed in a substantially horizontal position over the receptacle when the carrier is in the second mentioned position, the support having a notch in an edge thereof, and a reservoir provided with a neck defining its discharge opening and having a lug extending laterally from the neck and arranged to bear upon the support adjacent the aforesaid notch so as to sustain the reservoir with its neck in said notch and its discharge opening in a position to be liquid sealed in the distributing receptacle, and means on the support for preventing dislodgment of the lug therefrom.

3. In apparatus of the class described, a distributing receptacle, a carrier supported for movement between a reservoir receiving position at one side of the receptacle and a reservoir supporting position over the receptacle, the carrier including laterally spaced reservoir supporting parts that are disposed above the receptacle when the carrier is in the second mentioned position, and a reservoir provided with a neck defining its discharge opening and having substantially diametrically opposed lugs projecting from the neck for engagement with the aforesaid parts thereby to sustain the reservoir with its discharge opening in a position to be liquid sealed within the distributing receptacle, and means for preventing dislodgment of the lugs from the aforesaid parts.

4. In apparatus of the class described, a distributing receptacle, a carrier movably supported in operative relation thereto and shiftable between a reservoir receiving position at one side of the receptacle and a reservoir supporting position over the receptacle, a relatively flat reservoir support incorporated in the carrier and disposed in a substantially horizontal position over the receptacle when the carrier is in the second mentioned position, the support having a notch in an edge thereof, and a reservoir provided with a neck defining its discharge opening and having lugs extending laterally from the sides of the neck for engagement with the support on opposite sides of the aforesaid notch thereby to sustain the reservoir with its discharge opening in a position to be liquid sealed in the distributing receptacle, the aforesaid edge of the support on opposite sides of said notch being flanged upward to prevent dislodgment of the lugs from the support.

5. In apparatus of the class described, a distributing receptacle, a carrier hingedly supported for swinging movement on a horizontal axis between a reservoir receiving position at one side of the receptacle and a reservoir supporting position over the receptacle, the carrier incorporating a reservoir support that is disposed over the receptacle when the carrier is in the second mentioned position, and a reservoir provided with a neck defining its discharge opening and having abutment means extending laterally from the neck for engagement with the aforesaid support thereby to sustain the reservoir with its discharge opening in a position to be liquid sealed within the distributing receptacle, the reservoir having also a handle extending laterally from the neck in circumferentially spaced relation to the abutment means.

6. In apparatus of the class described, a distributing receptacle, a carrier hingedly supported for swinging movement on a horizontal axis between a reservoir receiving position at one side of the receptacle and a reservoir supporting position over the receptacle, the carrier including laterally spaced reservoir supporting parts that are disposed above the receptacle when the carrier is in the second mentioned position, and a reservoir provided with a neck defining its discharge opening and having substantially diametrically opposed lugs projecting from the neck for engagement with the aforesaid parts thereby to sustain the reservoir with its discharge opening in a position to be liquid sealed within the distributing receptacle, the reservoir being provided with a handle extending laterally from the neck intermediate said lugs.

7. In apparatus of the class described, a distributing receptacle, a carrier hingedly supported in operative relation thereto and swingable on a substantially horizontal axis between a reservoir receiving position at one side of the receptacle and a reservoir supporting position over the receptacle, a reservoir support incorporated in the carrier and disposed in substantially horizontal position over the receptacle when the carrier is in the second mentioned position, the support having a notch in an edge thereof, and a reservoir provided with a neck defining its discharge opening and having lugs extending laterally from the sides of the neck for engagement with the support on opposite sides of the aforesaid notch thereby to sustain the reservoir with its discharge opening in a position to be liquid sealed in the distributing receptacle, and parts on the support for preventing dislodgment of the lugs therefrom, the support being shaped to serve as a catch basin for liquid that drips from the part of the reservoir adjacent its discharge opening and to return such liquid to the distributing receptacle when moved thereover.

8. In apparatus of the class described, a distributing receptacle, a carrier hingedly supported in such relation thereto as to be swingable between a reservoir receiving position wherein it is inclined downwardly from one side of the receptacle and an upright reservoir supporting position over the receptacle, a reservoir support incorporated in the carrier and disposed in a substantially horizontal position over the receptacle when the carrier is in the second mentioned position, the support extending from the hinged side of the carrier toward the opposite side thereof and having a notch in its edge remote from said hinged side of the carrier, and a bottle-like reservoir having a neck and lugs projecting laterally from the neck for engagement with the support on opposite sides of said notch, the aforesaid edge of the support having flanges for preventing dislodgment of the lugs from the support, the end of the neck being a substantial distance beyond the support engaging parts of said lugs and defining the discharge opening of the receptacle whereby said opening is located in a position to be liquid sealed in said receptacle when the reservoir is sustained by the support in inverted position over the receptacle.

9. In apparatus of the class described, a distributing receptacle, a carrier hingedly supported in such relation thereto as to be swingable between a reservoir receiving position wherein it is inclined downwardly from one side of the receptacle and an upright reservoir supporting position over the receptacle, a relatively flat reservoir support incorporated in the carrier and disposed in a substantially horizontal position over the receptacle when the carrier is in the second mentioned position, the support extending from the hinged side of the carrier toward the opposite side thereof and having a notch in its edge remote from said hinged side of the carrier, and a bottle-like reservoir having a neck and lugs projecting laterally from the neck for engagement with the support on opposite sides of said notch, the support having means for preventing dislodgment of the lugs from the support, the end of the neck being a substantial distance beyond the support engaging parts of said lugs and defining the discharge opening of the receptacle whereby said opening is located in a position to be liquid sealed in said receptacle when the reservoir is sustained by the support in inverted position over the receptacle, the reservoir having a handle extending laterally from the neck between said lugs and on the side thereof remote from the hinged side of the carrier when the reservoir is in proper position in the carrier.

10. In apparatus of the class described, a basin-like distributing receptacle that is substantially rectangular in plan, a cabinet-like carrier of similar size and shape in plan to that of said receptacle and including a front wall, opposed side walls and a top wall, hinge connections between the upper front edge of the distributing receptacle and the bottom front edge of the carrier, a handle on the carrier adjacent the rear side of its top wall, a reservoir support incorporated in the carrier in approximately the plane of the aforesaid hinge connections, the rear edge of said support being provided with a notch at its middle and, on opposite sides thereof, with upward projections, a bottle-like reservoir having a neck defining its discharge opening and including lugs that extend laterally from the neck, said lugs having bearing surfaces facing in the direction of said opening for engagement with the support on opposite sides of the notch and forwardly of said projections, the vertical dimension of the reservoir above the plane of the bearing surfaces of the aforesaid lugs being less than the distance between said projections and the top wall of the carrier, and a retainer depending from the rear side of the top wall of the carrier below the plane of the adjacent end of the reservoir, the carrier being adapted to be swung from an upright position over the distributing receptacle to a downwardly inclined position forwardly of said receptacle.

CHARLES J. KESSLER.